United States Patent
Tanaka et al.

(10) Patent No.: US 6,449,955 B2
(45) Date of Patent: Sep. 17, 2002

(54) METHOD FOR FILLING FUEL GAS IN A GAS TURBINE

(75) Inventors: Tomoka Tanaka, Hyogo-ken (JP); Kazuya Higashi, Hyogo-ken (JP); Shigeki Wakamatsu, Hyogo-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/772,962

(22) Filed: Jan. 31, 2001

(30) Foreign Application Priority Data

Feb. 1, 2000 (JP) ............................ 2000-024330

(51) Int. Cl.[7] ............................................. F02C 7/22
(52) U.S. Cl. ........................ 60/776; 60/39.094; 60/734
(58) Field of Search ....................... 60/39.094, 39.463, 60/39.465, 734, 776; 244/135 R

(56) References Cited

U.S. PATENT DOCUMENTS 5,899,073 A * 5/1999 Akimaru .................... 60/734

6,256,975 B1 * 7/2001 Dobbeling et al. ...... 60/39.094

* cited by examiner

Primary Examiner—Louis J. Casaregola
(74) Attorney, Agent, or Firm—Wenderoth, Lind & Ponack, L.L.P.

(57) ABSTRACT

The gas turbine fuel gas filling apparatus includes a main fuel valve, a fuel valve, an inert gas purge valve, and a pressure detector for detecting a pressure in the fuel line. The main fuel valve is gradually opened, and fixed to a valve opening at a time when a predetermined first pressure condition is established. Pressure is measured after lapse of a predetermined time. The main fuel valve is gradually opened until a second pressure condition is established. Pressure is measured upon a completion of gas-filling. With establishment of a third pressure condition, the inert purge relief valve is closed. With establishment of a fourth pressure condition, the main fuel valve is fully opened.

16 Claims, 4 Drawing Sheets

FIG.1

| VALVES \ OPERATIONS | ① | ②③ | ④⑤ | ⑥ | ⑦ |
|---|---|---|---|---|---|
| FUEL MAIN VALVE 2 | CLOSE | | | | FULL-OPEN |
| FUEL SHUTOFF VALVE 3 | CLOSE | | | | |
| FUEL RELIEF VALVE 10 | OPEN | | | | |
| NITROGEN PURGE SUPPLY VALVE 6 | CLOSE | | | | |
| NITROGEN PURGE SUPPLY VALVE 7 | CLOSE | | | | |
| NITORGEN PURGE RELIEF VALVE 4 | CLOSE | OPEN | CLOSE | | |
| NITORGEN PURGE RELIEF VALVE 5 | CLOSE | OPEN | | CLOSE | |

METHOD FOR FILLING FUEL GAS IN A GAS TURBINE

FIELD OF THE INVENTION

The present invention in general relates to a method and apparatus for filling fuel gas in a gas turbine. More particular, this invention relates to a method and apparatus for filling fuel gas in a gas turbine which can supply a predetermined fuel gas flow in accordance with the system state, by automatically changing open-close timings such as of a purge relief valve and a gas-filling opening of a main fuel valve, depending on an actual state of gas-filling, and by which adjustment work can be saved.

BACKGROUND OF THE INVENTION

In a gas-fired gas turbine, it is necessary to perform a gas-filling process with respect to the fuel line (from a main fuel valve (or fuel gas supply valve) to a fuel shutoff valve) before the startup. This process is necessary, after a long-term shutdown of or inspection to the gas turbine where the fuel line should have been filled with an inert gas such as nitrogen, for replacement of the inert gas with a fuel gas at the startup to avoid supplying a combustor nozzle with mixture of fuel gas and inert gas, to thereby prevent a failure of light-up. The main fuel valve, to be open in usual run, should have a possibly reduced pressure loss, and hence a ball valve is employed therefore.

An automated unit for a series of sequential actions for such a gas-filling is adapted to simply open and close a main fuel valve (with a constant gas-filling opening) and a purge valve, with lapse of time. In a certain case, as the main fuel valve, there is employed no ball valve, but a dedicated valve apparatus that enables a delicate opening setting. However, such a case is out of the scope of the present invention.

A conventional automated gas-filling sequence performs mere opening and closing respectively of a main fuel valve (with a constant gas-filling opening) and a purge valve, with lapse of time (without feeding back a valve condition), so that the main fuel valve has an opening interval variable with associated system states (line length, diameter, configuration, etc.), resulting in troublesome on-site adjustment for setting the interval.

Moreover, the main fuel valve (ball valve) has an opening characteristic on which a delicate opening setting is difficult, and fails to follow a uniform gas-filling operation, due to different system states, such as inline temperature and pressure for gas-filling and flow characteristic of the main fuel valve, as another problem.

Further, the main fuel valve, which has difficulty with a delicate opening setting, causes a fuel gas to vigorously outflow when opened, with an impact that generates noises and may give damages to various devices.

Further, there is an associated tendency to release unburnt gases into the atmosphere until a predetermined time interval elapses, wasting fuel gas, which is non-economical, and unfavorable also in respect of environmental protection.

SUMMARY OF THE INVENTION

It is an object of the present invention to provide a method and apparatus for filling fuel gas in a gas turbine that is able, in a gas turbine plant provided with a fuel main valve comprised of a ball valve, to supply a predetermined gas flow in an adequate manner in accordance with a system state, thereby implementing adjustment labor saving and cost-down, noise reduction, reduction in degree of impact to a variety of devices, and the like.

The gas turbine fuel gas filling apparatus according to one aspect of this invention comprises a main fuel valve installed upstream of a fuel line and comprised of a ball valve, a fuel valve installed downstream of the fuel line and upstream of a combustor nozzle, an inert gas purge valve for purging out of the fuel line an inert gas supplied into the fuel line by a supply unit of the inert gas, and a pressure detector for detecting a pressure in the fuel line. Furthermore, the main fuel valve is gradually opened to be fixed to a valve opening at a time when a predetermined first pressure condition of the fuel line is established; after lapse of a predetermined time, again checking a state of pressure, the main fuel valve is gradually opened until a second pressure condition is established; the state of pressure is checked also upon a completion of gas-filling; the inert gas purge release valve is closed with establishment of a third pressure condition; and the main fuel valve is fully opened with establishment of a fourth pressure condition. A predetermined fuel gas flow is thereby adequately supplied to the fuel line in accordance with a system state.

Further, the number of times the pressure condition is set and the duration for which the measurement is performed are increased or decreased based on the system state.

The gas turbine fuel gas filling apparatus preferably further comprises a control valve for correcting a flow rate of gas outflowing from the main fuel valve in dependence on a state of temperature and pressure in the fuel line.

The gas turbine fuel gas filling apparatus preferably further comprises a combination of a bypass valve and an orifice for correcting a flow rate of gas outflowing from the main fuel valve in dependence on a state of temperature and pressure in the fuel line.

Furthermore, it is preferable that the fuel gas is natural gas.

Furthermore, it is preferable that the inert gas is nitrogen gas.

The method of filling fuel gas in a gas turbine, which gas turbine comprises a fuel line for supplying the fuel gas; a main fuel valve provided on the fuel line; a fuel valve provided on the fuel line on the downstream of the main fuel valve; a combustor nozzle as an outlet for the fuel gas; an inert gas supply for supplying an inert gas to the fuel line; an inert gas purge valve for purging out the inert gas out of the fuel line; and a pressure detector for detecting a pressure in the fuel line, according to another aspect of this invention comprises following steps.

1) Gradually opening the main fuel valve and simultaneously checking the pressure in the fuel line detected by the pressure detector.

2) Stopping opening of the main fuel valve when the pressure detected by the pressure detector has reached a predetermined first pressure.

3) Waiting for lapse of a predetermined time.

4) Checking the pressure in the fuel line detected by the pressure detector and determining whether the pressure detected by the pressure detector has reached a predetermined second pressure.

5) Gradually further opening the main fuel valve if the pressure detected by the pressure detector has not reached the second pressure.

6) Checking the pressure in the fuel line detected by the pressure detector and determining whether the pressure detected by the pressure detector has reached a predetermined third pressure.

7) Closing said inert gas purge release valve if the pressure detected by the pressure detector has reached the third pressure.

8) Checking the pressure in the fuel line detected by the pressure detector and determining whether the pressure detected by the pressure detector has reached a predetermined fourth pressure.

9) Fully opening the main fuel valve if the pressure detected by the pressure detector has reached the fourth pressure.

Other objects and features of this invention will become apparent from the following description with reference to the accompanying drawings.

DESCRIPTION OF THE DRAWINGS

FIG. 1 is a time chart describing gas admission of a fuel gas supply system of a gas turbine fuel gas filling apparatus according to a first embodiment of the invention;

DESCRIPTION OF THE PREFERRED EMBODIMENTS

Preferred embodiments of the gas turbine fuel gas filling apparatus according to the present invention will be described in detail below with reference to the accompanying drawings. However, this invention is not limited by these embodiments.

Figure 2:
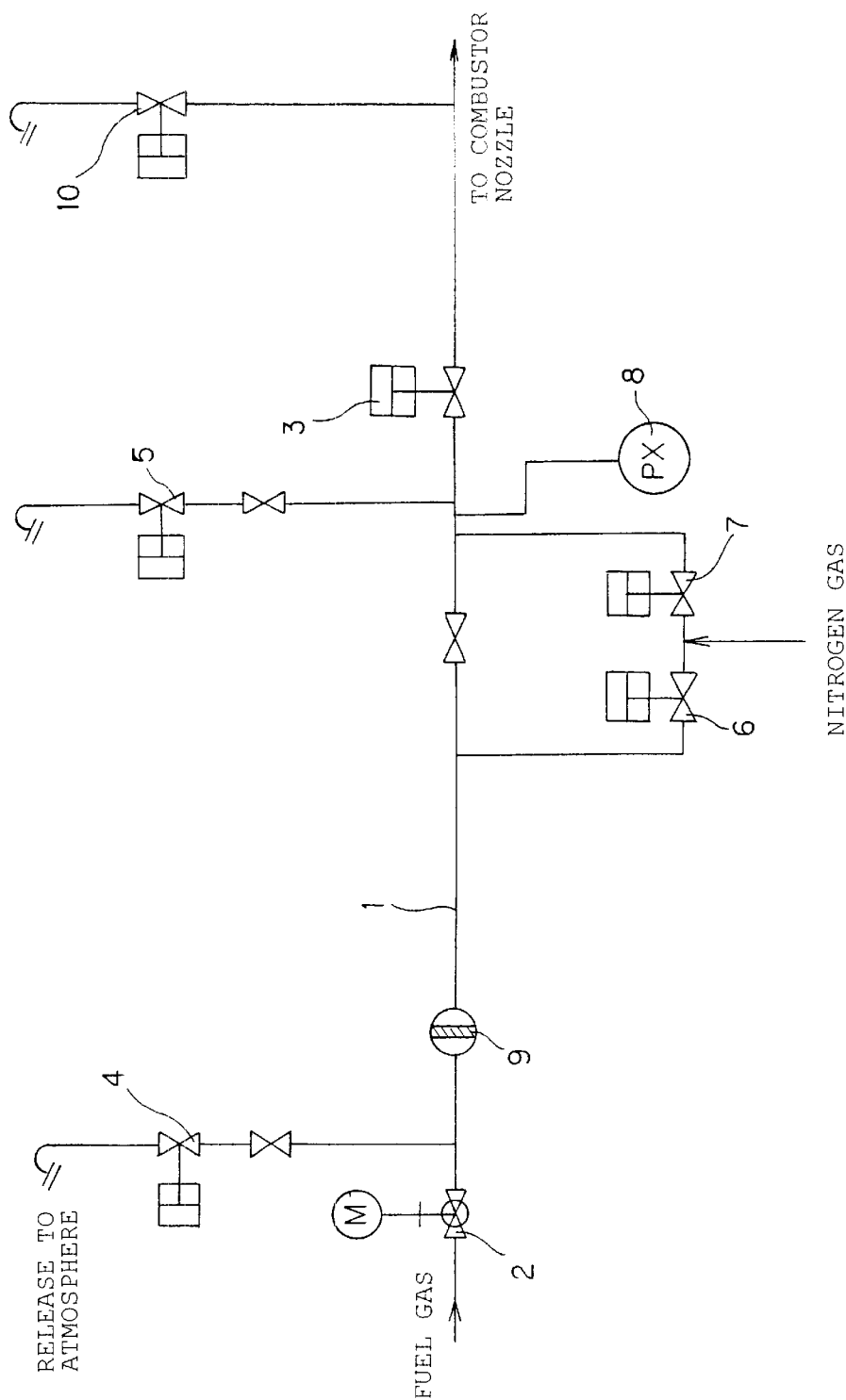
FIG. 2 is a diagram illustrating the fuel gas supply system of the gas turbine fuel gas filling apparatus.

FIG. 1 is a time chart describing gas admission of the fuel gas supply system of the gas turbine fuel gas filling apparatus according to a first embodiment of the invention. The width of the hatched portion indicates an amount for which a valve is opened. The numbers (1) to (7) indicate operations. FIG. 2 is a diagram illustrating the fuel gas supply system of the gas turbine fuel gas filling apparatus.

The present invention relates to filling of a fuel gas (for example, natural gas) in a fuel line 1, between a main fuel valve 2 and a fuel shutoff valve 3. Following valves are used for filling the gas. That is, a nitrogen purge relief valve 4 installed near the main fuel valve 2; and a nitrogen purge relief valve 5 installed in a release system to the atmosphere. Nitrogen purge supply valves 6, 7 are for supply of nitrogen gas to the fuel line 1.

A pressure gauge 8, installed as a pressure detector in the fuel line 1, monitors a condition of fuel supply to the fuel line 1, and feeds back the pressure data to an inching opening control of the main fuel valve 2. The fuel line 1 is provided with a strainer 9 for fuel filtration, a fuel relief valve 10 for excessive gas fuel to be released into the atmosphere, and so on. For control of such valves as 2 to 7 and 10 as well as calculations of pressure data, there is a controller (not shown) configured to execute automatic processing.

A method of filling the gas will now be described with reference to FIG. 1. At a start of gas filling, the main fuel valve 2 is gradually inched opened (operation (2)), and fixed to a valve opening at a time when a first predetermined pressure condition (i.e. an inlet pressure of the fuel shutoff valve 3 to be measured by the pressure gauge 8, as used herein) is established (operations (3) and (4)). After a lapse of a predetermined time, the state of pressure is checked again (operation (4)), and the main fuel valve 2 is gradually opened until a subsequent pressure condition becomes established (operations (4) and (5)). The state of pressure is checked upon a completion of gas-filling, as well, and with establishment of a third pressure condition, the nitrogen purge relief valve 5 is closed (operation (6)), and then with a fourth pressure condition established, the main fuel valve 2 is fully opened (operation (7)).

In this manner, the state of pressure is checked at the respective points, thereby permitting an optimal gas-filling in accordance with a system state. Effective prevention is thus possible against conventional drawbacks, such as release of unburnt gases that might have been excessive in gas-filling, impact sounds due to rushing fuel gas, and shocks of the impact to various devices.

According to the first embodiment, a gas turbine fuel gas filling apparatus allows the flow rate of outflowing gas to be optimized in gas-filling, thereby permitting cost-down, noise reduction, and a reduced shock to devices.

Without the need to perform an on-site adjustment for conventional opening interval setting of main fuel valve 2, adjustment labor savings is achieved.

The first embodiment employs nitrogen gas as an inert gas. The inert gas, however, is not limited thereto, and may well be another that is poorly reactive to fuel gas. The strainer 9, fuel relief valve 10, nitrogen purge relief valve 5, nitrogen purge supply valve 6, 7 and the like may be voluntarily increased in number, as circumstances require, and not limited to the illustrated example.

Although the description has been made of a fuel gas filling in a gas turbine plant, the present invention may have other applications such as water-filling of a steam turbine circulation water or condenser water chamber.

Figure 3:
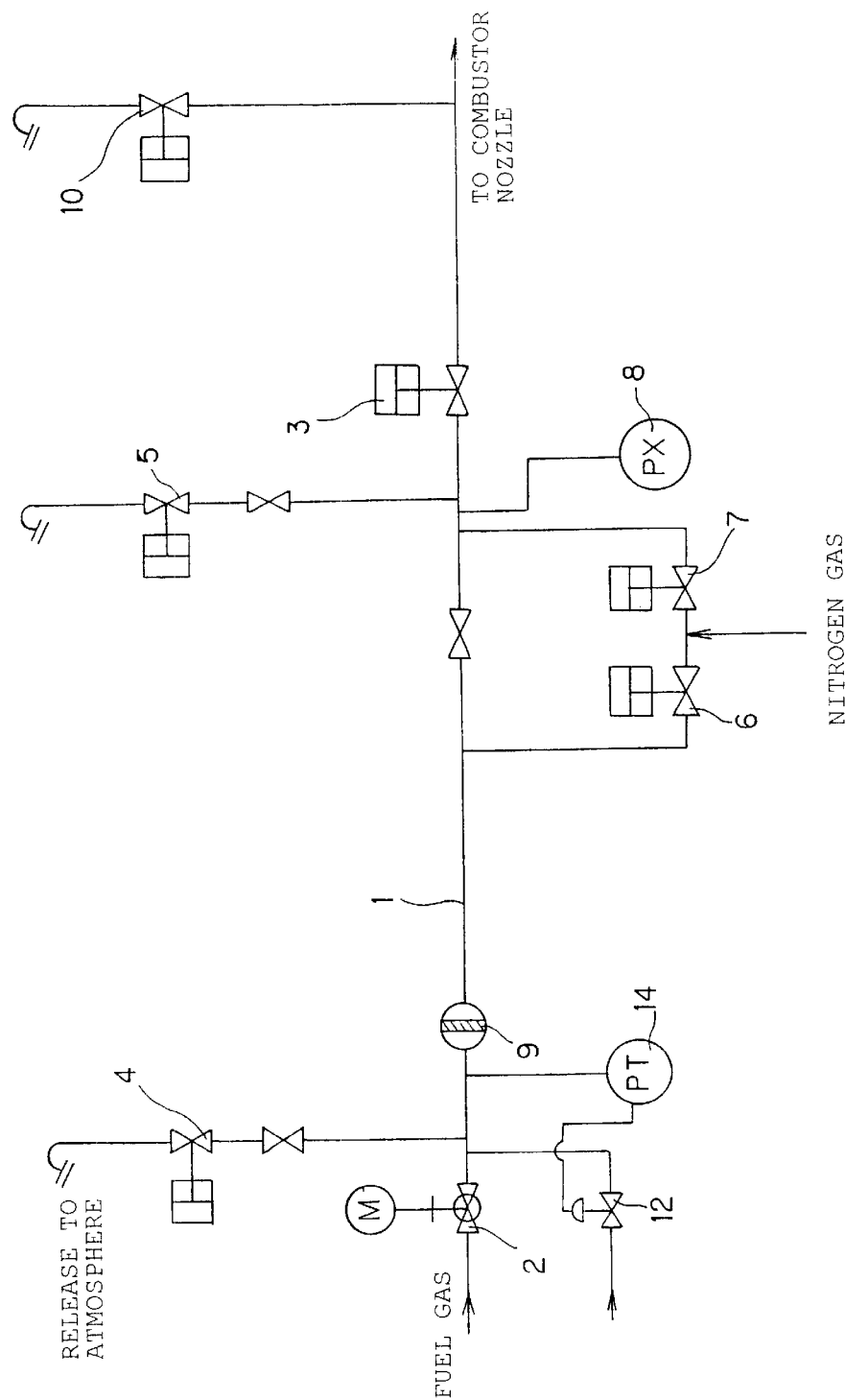
FIG. 3 is a diagram illustrating a fuel gas supply system of a gas turbine fuel gas filling apparatus according to a second embodiment of the invention.

FIG. 3 is a diagram illustrating a fuel gas supply system of the gas turbine fuel gas filling apparatus according to the second embodiment of the invention. Although in the first embodiment a pressure condition by the pressure gauge 8 is fed back for inching open the main fuel valve 2, the second embodiment employs, in addition to the same, a pressure-temperature gauge 14 as a pressure and temperature detector for measuring pressure and temperature conditions of a fuel line 1 to provide measurement values to be based on for automatic control of a control valve 12, thereby controlling the flow rate of gas outflowing from a main fuel valve 2. The remaining arrangement and actions are analogous to those of the first embodiment, and their description is omitted.

According to the second embodiment, a gas turbine fuel gas filling apparatus is adapted, by provision of the control valve 12 and pressure-temperature gauge 14, to optimize the flow rate of outflowing gas in gas-filling, thereby permitting cost-down, noise reduction, and a reduced shock to devices.

Figure 4:
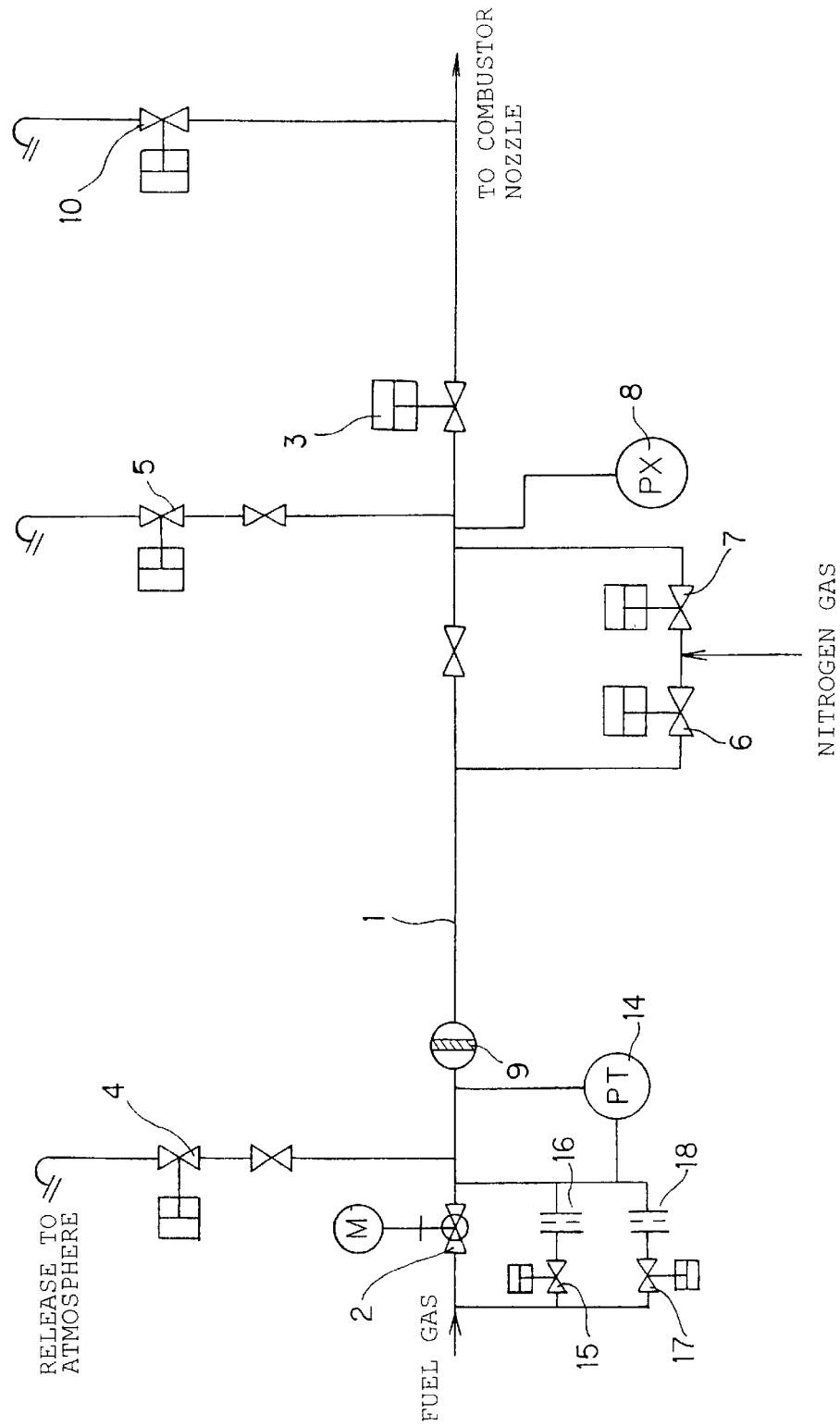
FIG. 4 is a diagram illustrating a fuel gas supply system of a gas turbine fuel gas filling apparatus according to a third embodiment of the invention.

FIG. 4 is a diagram illustrating a fuel gas supply system of the gas turbine fuel gas filling apparatus according to the third embodiment of the invention. Although in the first embodiment a pressure condition by the pressure gauge 8 is fed back for inching open the main fuel valve 2, the third embodiment employs, in addition to the same, a pressure-temperature gauge 14 as a pressure and temperature detector for measuring pressure and temperature conditions of a fuel line 1 to provide measurement values to be based on for operation of bypass control valves 15, 17 and orifices 16, 18, thereby controlling the flow rate of gas outflowing from a main fuel valve 2. The remaining arrangement and actions are analogous to those of the first embodiment, and their description is omitted.

According to the third embodiment, a gas turbine fuel gas filling apparatus is adapted, by provision of the pressure-temperature gauge 14, bypass control valves 15, 17, and orifices 16, 18, to optimize the flow rate of outflowing gas in gas-filling, thereby permitting cost-down, noise reduction, and a reduced shock to devices.

Thus, according to one aspect of this invention, the gas turbine fuel gas filling apparatus comprises a main fuel valve installed upstream of a fuel line and comprised of a ball valve, a fuel valve installed downstream of the fuel line and upstream of a combustor nozzle, an inert gas purge valve for purging out of the fuel line an inert gas supplied into the fuel line by a supply unit of the inert gas, and a pressure detector for detecting a pressure in the fuel line. Furthermore, the main fuel valve is gradually opened to be fixed to a valve opening at a time point when a predetermined first pressure condition of the fuel line is established; after lapse of a predetermined time, again checking a state of pressure, the main fuel valve is gradually opened until a second pressure condition is established; the state of pressure is checked also upon a completion of gas-filling; the inert gas purge release valve is closed with establishment of a third pressure condition; and the main fuel valve is fully opened with establishment of a fourth pressure condition, whereby a predetermined fuel gas flow is adequately supplied to the fuel line in accordance with a system state.

Accordingly, by optimizing the flow rate of outflowing gas in gas-filling, there can be implemented cost-down, noise reduction, a reduced shock to devices, and the like. Further, without the conventional need of on-site adjustment for opening interval setting of a main fuel valve, adjustment labor is saved.

Further, the number of times the pressure condition is set and the duration for which the measurement is performed are increased or decreased based on the system state. Thereby, depending on a system state of a turbine plant, an adequate condition setting is allowed, permitting a smoother gas-filling operation.

The gas turbine fuel gas filling apparatus further comprises a control valve for correcting a flow rate of gas outflowing from the main fuel valve based on a temperature and pressure in the fuel line. Thereby, the flow rate of gas outflowing from the main fuel valve can be set more delicately.

The gas turbine fuel gas filling apparatus further comprises a combination of a bypass valve and an orifice for correcting a flow rate of gas outflowing from the fuel main valve based on a temperature and pressure in the fuel line. Thereby, the flow rate of gas outflowing from the main fuel valve can be set more delicately.

Furthermore, the fuel gas is natural gas. This allows an easy application to a gas turbine plant using a general-purpose fuel.

Furthermore, the inert gas is nitrogen gas. This allows an easy and inexpensive application to a gas turbine plant using a natural gas fuel.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of filling fuel gas in a gas turbine comprising a fuel line for supplying the fuel gas, a main fuel valve provided in the fuel line, a fuel valve provided in the fuel line so as to receive fuel gas that has passed through the fuel main valve, a combustor nozzle for allowing discharging of the fuel gas, an inert gas supply for supplying an inert gas to the fuel line, an inert gas purge valve for purging the inert gas out of the fuel line, and a pressure detector for detecting a pressure in the fuel line, said method comprising:

gradually opening the main fuel valve and simultaneously checking the pressure in the fuel line via the pressure detector;

stopping said gradual opening of the fuel main valve when the pressure detected by the pressure detector has reached a predetermined first pressure;

waiting a predetermined amount of time;

checking the pressure in the fuel line via the pressure detector and determining whether the pressure detected by the pressure detector is a predetermined second pressure;

gradually further opening of the main fuel valve if the pressure detected by the pressure detector has not reached the predetermined second pressure, checking the pressure in the fuel line via the pressure detector and determining whether the pressure detected by the pressure detector is a predetermined third pressure;

closing the inert gas purge valve if the pressure detected by the pressure detector is the predetermined third pressure;

checking the pressure in the fuel line via the pressure detector and determining whether the pressure detected by the pressure detector is a predetermined fourth pressure; and fully opening the main fuel valve if the pressure detected by said pressure detector is the predetermined fourth pressure.

2. The method according to claim 1, wherein the number of times the pressure condition is set and the duration for which the measurement is performed are increased or decreased based on a system state.

3. The method according to claim 1, further comprising correcting a flow rate of gas flowing out from the fuel main valve based on a state of temperature and pressure in the fuel line.

4. The method according to claim 1, wherein the fuel gas is a natural gas.

5. The method according to claim 1, wherein the inert gas is nitrogen gas.

6. The method according to claim 2, wherein the system state is based on at least one of a length, a shape or a diameter of fuel pipes in the gas turbine.

7. The method according to claim 2, wherein the system state is based on a temperature of or pressure in fuel pipes in the gas turbine when the fuel pipes are full of fuel gas.

8. The method according to claim 2, wherein the system state is based on flow characteristics of the fuel main valve and the inert gas purge valve.

9. A method of filling fuel gas in a gas turbine comprising a fuel line for supplying the fuel gas, a main fuel valve provided on the fuel line, a fuel valve provided in the fuel line so as to receive fuel gas that has passed through the main fuel valve, a combustor nozzle for discharging the fuel gas, an inert gas supply for supplying an inert gas to the fuel line, an inert gas purge valve for purging the inert gas out of the fuel line, and a pressure detector for detecting a pressure in the fuel line, said method comprising:

gradually opening the main fuel valve and simultaneously checking the pressure in the fuel line via a pressure detector;

stopping said gradual opening of the main fuel valve when the pressure detected by the pressure detector has reached a first predetermined pressure;

checking the pressure in the fuel line via the pressure detector and determining whether the pressure detected by the pressure detector is a second predetermined pressure;

gradually further opening the main fuel valve if the pressure detected by the pressure detector has not reached the second predetermined pressure, checking the pressure in the fuel line via the pressure detector and determining whether the pressure detected by the pressure detector is a third predetermined pressure;

closing the inert gas purge valve if the pressure detected by the pressure detector has reached the third predetermined pressure;

checking the pressure in the fuel line via the pressure detector and determining whether the pressure detected by the pressure detector is a predetermined fourth pressure; and fully opening said fuel main valve if the pressure detected by said pressure detector is the predetermined fourth pressure.

10. The method according to claim 9, wherein the number of times the pressure condition is set and the duration for which the measurement is performed are increased or decreased based on a system state.

11. The method according to claim 10, wherein the system state is based on at least one of a length, a shape or a diameter of fuel pipes in the gas turbine.

12. The method according to claim 10, wherein the system state is based on a temperature of or a pressure in fuel pipes in the gas turbine when the fuel pipes are full of fuel gas.

13. The method according to claim 10, wherein the system state is based on flow characteristics of the main fuel valve and the inert gas purge valve.

14. The method according to claim 9, further comprising correcting a flow rate of gas flowing out from the main fuel valve based on a state of temperature and pressure in the fuel line.

15. The method according to claim 9, wherein the fuel gas is natural gas.

16. The method according to claim 9, wherein the inert gas is nitrogen gas.

* * * * *